United States Patent
Greisz

(10) Patent No.: US 6,262,855 B1
(45) Date of Patent: Jul. 17, 2001

(54) INFRARED LASER BEAM VIEWING APPARATUS

(75) Inventor: Mark J. Greisz, Vancouver, WA (US)

(73) Assignee: Seh America, Vancouver, WA (US)

(*) Notice: Subject to any disclaimer, the term of this patent is extended or adjusted under 35 U.S.C. 154(b) by 0 days.

(21) Appl. No.: 09/447,374

(22) Filed: Nov. 23, 1998

(51) Int. Cl.[7] .................................................. G02B 5/22
(52) U.S. Cl. ...................... 359/885; 359/889; 359/892; 252/587; 250/339.11; 250/339.14; 250/341.8; 356/51
(58) Field of Search ..................... 359/885, 889, 359/892; 252/587; 250/334, 339.11, 339.14, 341.8, 482.1, 487.1; 356/51

(56) References Cited

U.S. PATENT DOCUMENTS

| | | | |
|---|---|---|---|
| 3,279,938 | * 10/1966 | Schneeberger | 428/216 |
| 3,926,835 | * 12/1975 | Tucker | 359/885 |
| 4,622,174 | 11/1986 | McKay et al. . | |
| 4,933,110 | 6/1990 | Tucker . | |
| 4,947,465 | 8/1990 | Mather et al. . | |
| 5,511,140 | 4/1996 | Cina et al. . | |
| 5,537,504 | 7/1996 | Cina et al. . | |
| 5,631,767 | * 5/1997 | Dodge | 359/328 |
| 5,705,101 | * 1/1998 | Oi | 252/587 |
| 5,878,072 | 3/1999 | Greisz . | |

FOREIGN PATENT DOCUMENTS

0570891B1   3/1999   (EP) .

* cited by examiner

Primary Examiner—Audrey Chang
Assistant Examiner—Leo Boutsikaris
(74) Attorney, Agent, or Firm—Douglas G. Anderson

(57) ABSTRACT

An apparatus and method for inspecting the quality of a Nd-YAG laser beam after encountering an optic in a laser marking machine is provided. The apparatus includes a bezel that houses a filter medium that significantly increases the visible power intensity between the threshold-of-visibility to the point of saturation of a beam when viewed with an infrared electroviewer. The apparatus of the present invention is held in the path of the laser beam, and the beam is inspected with an infrared electroviewer. Occlusions in the power range of the beam found between the increased range of threshold-of-visibility to saturation point caused by imperfections in the optics can then be seen with an infrared electroviewer.

12 Claims, 7 Drawing Sheets

INFRARED LASER BEAM VIEWING APPARATUS

BACKGROUND OF THE INVENTION

The present invention relates to an infrared laser beam viewing apparatus used in connection with inspecting and improving the quality of a laser beam emitted from a laser.

Infrared lasers, such as Neodymium yttrium-aluminum-garnet (Nd-YAG) lasers are used for scribing identification marks on semiconductor wafers. These marks can be located anywhere on the planar surfaces of a wafer, and can be alphanumeric, bar code, or any other desired marking pattern. In manufacturing satisfactory marks, the power intensity, location, and focus of the laser beam must be carefully controlled. To scribe wafers, the laser beam will leave the generator, and pass through a path of several mirrors and lenses before reaching the marking surface. Since the current art for marking semiconductor wafers requires marking tolerances within microns, laser beam placement, focus, and power intensity are critical.

One of the problems inherent with scribing wafers is properly controlling the quality of the laser beam as it passes through the various optics. Ideally, the laser beam should be aligned so that the center of the laser beam strikes or passes through the center of the various optics along its path, and that the optics used are defect free. Keeping the center of the laser beam in the center of the defect-free optics reduces distortion of the laser beam and minimizes power loss, whereas optics with defects, or optics that are not aligned properly, produce a distorted beam which increases power usage and inhibits or prohibits achieving required tolerances. However, the beam produced by a Nd-YAG laser falls in the infrared light spectrum, and cannot be seen by the naked eye. Therefore, to align the laser beam and check the beam quality through the optics, either a phosphor-covered disk or an infrared viewing scope may be used to track the location of the laser beam.

Unfortunately, neither of these methods for viewing the laser beam produces a sharp image of the periphery of the laser beam. Neither tool provides the ability to distinguish power variations across the beam. As illustrated in FIG. 1, the power intensity across the beam produces a gaussian curve with the highest power found at the center of the beam, and power decreasing normally on both sides. Unfortunately, neither the viewing scope nor the phosphor block allows this gaussian curve to be seen. Therefore, if there is an occlusion in an optic, or the alignment is not centered on the optic, this curve will be altered, thus changing the predicted functionality of the beam. Since the marking process for semiconductor wafers requires tolerances in the micron range, it is imperative that the laser beam be known and properly characterized. As a result of a non-normal shaped curve during the marking process on a wafer, the width and depth of the mark are impossible to control, thus the mark will not meet the required specifications.

The phosphor-covered disk, such as the Near IR Display Plate Model 24, manufactured by Optical Engineering, Inc., when held in the direct path of the laser beam, produces a visible green image where the beam strikes the phosphor. There are some significant disadvantages associated with this technique however. First, as illustrated in FIG. 2, the sensitivity of the block is such that it is only able to display beam power at or above approximately 0.3 watts, which prohibits viewing the outer periphery of the beam. Another distinct disadvantage of this method is that the phosphor block becomes saturated almost immediately upon reaching the threshold of visibility. Therefore, the central part of the beam that is viewable all appears the same, and the variable power area is so small that no details can be determined about power variability in beam. Finally this method requires that the beam strike the phosphor directly, and therefore only provides information about the beam where it strikes the phosphor. In each of FIGS. 2, 3, and 5, area 5 represents the saturated area of the beam intensity viewing method, areas 3 and 4 are the variable intensity regions where the intensity increases as it moves toward area 5, and areas 1 and 2 are the areas below the threshold of visibility.

An alternate method of viewing the beam uses an infrared viewing scope, a camera-like device that produces an image on a monitor displaying where the beam contacts an optical surface such as a mirror or lens. One such infrared viewing scope is the Infrared Electroviewer Model 7215, manufactured by Electrophysics Corp. Although the infrared viewing scope provides the opportunity to observe the beam as it interacts with the surface it is striking, it also has the disadvantage of being extremely sensitive to power output. As illustrated in FIG. 3, the infrared viewing scope only displays the part of the beam that is absorbed within the glass of the optic it strikes, which is usually between 5% and 10%. This small amount does not satisfactorily provide information about the quality of the beam. The infrared viewer has a very low power threshold of approximately 0.003 watts, but similar to the phosphor block, it saturates at a power level very close to the threshold. The image on the infrared viewer appears the same for any power higher than the saturation point, again providing little or no information about the quality of the beam in the outer periphery.

Filters have been used to assist in inspection of peripheral edges of laser beams by increasing the range of visible-to-saturation thresholds. These lenses have historically been manufactured out of glass that is manufactured to very exacting standards for shape and surface smoothness, among other parameters. These filters work reasonably well in a controlled environment where safety can easily be controlled, but are dangerous for use in manufacturing facilities where there are many people, and protective equipment is limited. When a laser beam strikes a filter medium, a portion of the beam is reflected. With a glass filter medium with a smooth surface, the reflected beam is not dispersed, but rather is often concentrated, and very dangerous for people working in proximity to the laser. Also, filter mediums also absorb some of the energy from the beam, and occasionally the filter will shatter, sometimes very violently.

Accordingly, a need has developed that allows a laser beam operator to view and monitor the peripheral edge of the laser beam for imperfections caused by such things as power problems or occlusions in one or more optical components, as the beam interacts with the optical components using a filter medium that will disperse reflected light, and will not shatter.

SUMMARY OF THE INVENTION

The present invention overcomes the foregoing drawbacks of the prior art by providing a filter apparatus that increases the range of power between the threshold and the saturation points visible with an infrared viewer, thereby providing a view of the periphery of the beam that shows the quality of the beam in that power region. The apparatus is used in conjunction with a laser generator that emits a laser beam. A frame includes a filter medium that has an absorbency of approximately four percent, 8% reflectivity, and 88% transmissibility at 1.06 micron wavelength light. The filter medium is of a flexible plastic, with a relatively rough surface that will disperse any reflected beam. Since the filter medium is made of flexible plastic, if the filter absorbs too much energy from the beam, it will simply melt. The destroyed filter medium can easily be removed from the bezel and a new filter medium replaced.

The frame is held in the path of the laser beam, and the infrared viewer is then used to view the beam, and in particular provide a view of the peripheral part of the beam that is affected by the absorbency of the filter medium.

The present invention provides the distinct advantage of being able to visually see the quality of the peripheral portion of the laser beam. This ability to see the peripheral portion of the beam allows the technician to detect irregularities in the beam periphery caused by occlusions in the optics or problems with the laser generator itself.

DETAILED DESCRIPTION OF THE INVENTION

Figure 1:
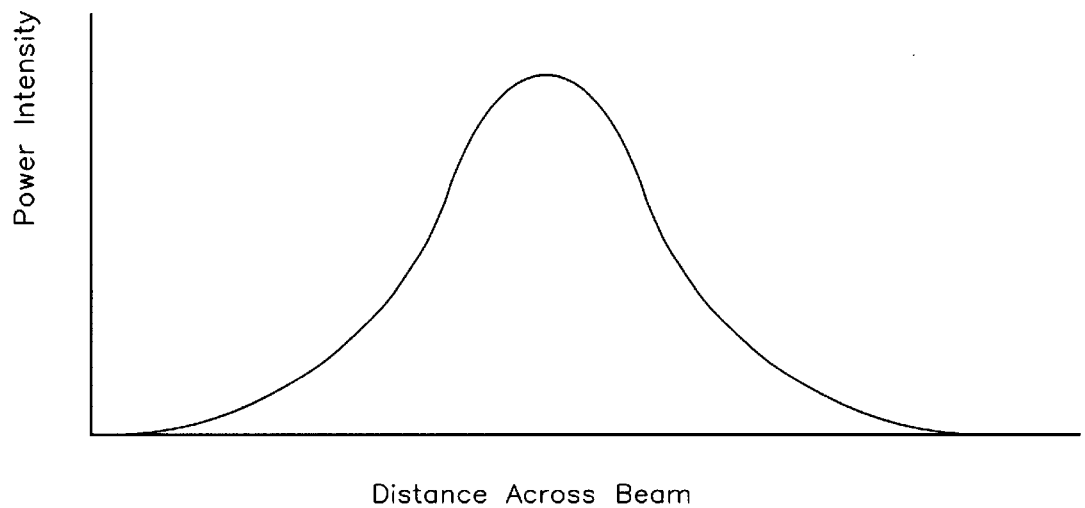
FIG. 1 depicts a plot of a laser beam with power intensity plotted on the ordinate and a cross section of the beam on the abscissa.
Figure 2:
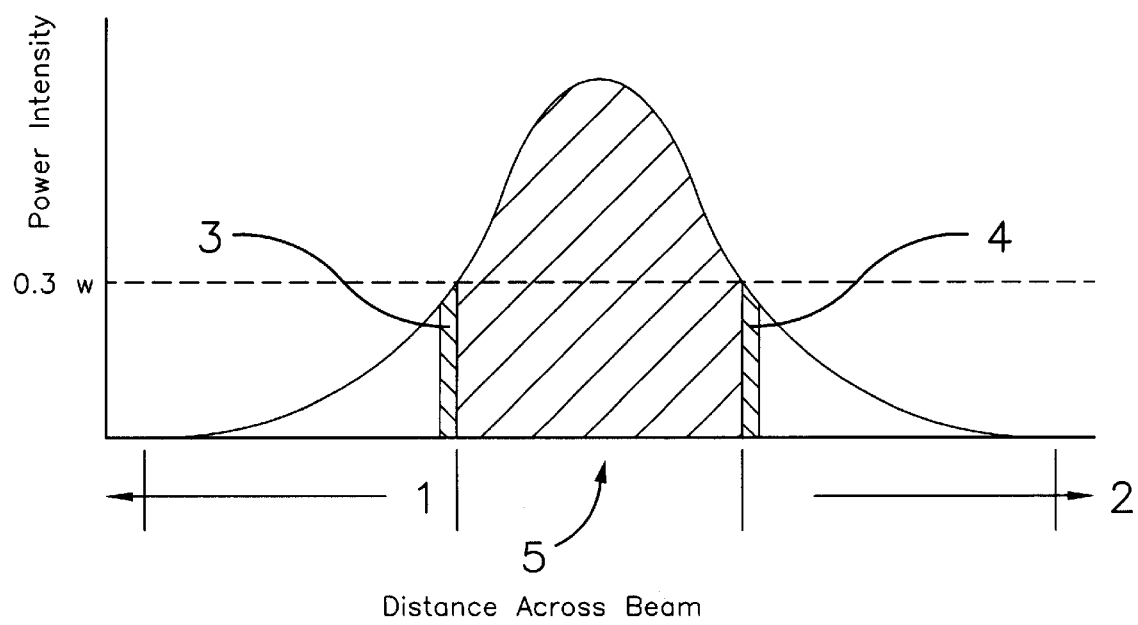
FIG. 2 depicts the response of a phosphor block on a power intensity plot of a laser beam showing the saturated area, the variable intensity area, and the non-visible area.
Figure 3:
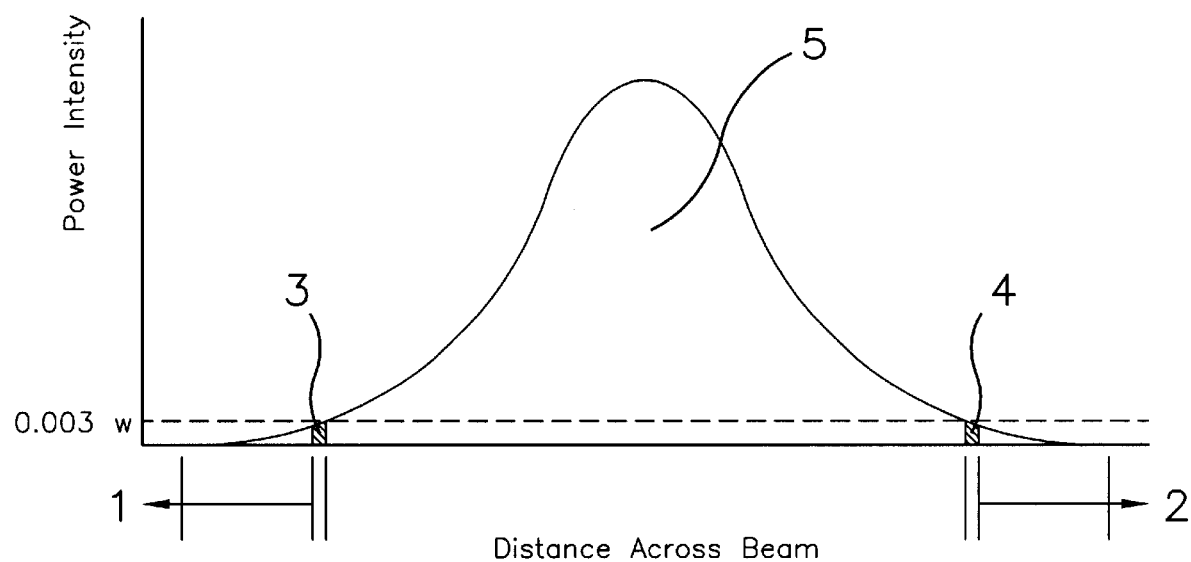
FIG. 3 depicts the response of an infrared electroviewer on a power intensity plot of a laser beam showing the saturated area, the variable intensity area, and the non-visible area.
Figure 4:
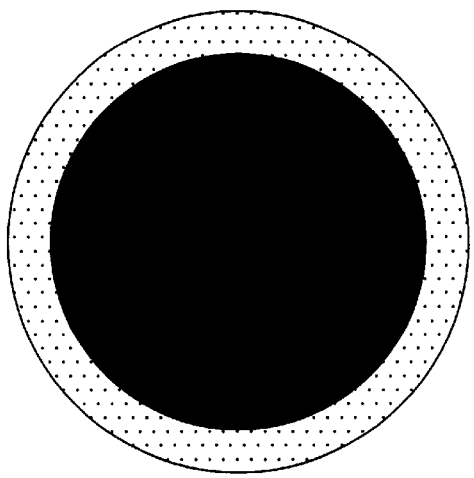
FIG. 4 depicts a representation of the operator's view of power intensity of a laser beam using an infrared electroviewer.
Figure 5:
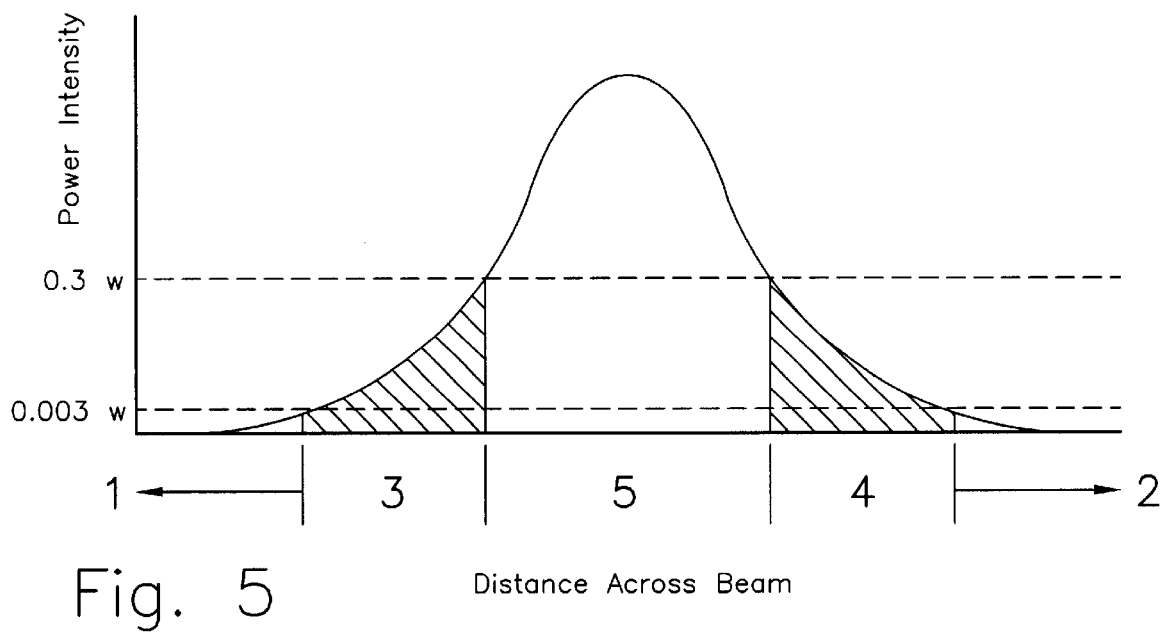
FIG. 5 depicts the response of an infrared electroviewer on a power intensity plot of a laser beam showing the saturated area, the variable intensity area, and the non-visible area using the present invention.
Figure 6:
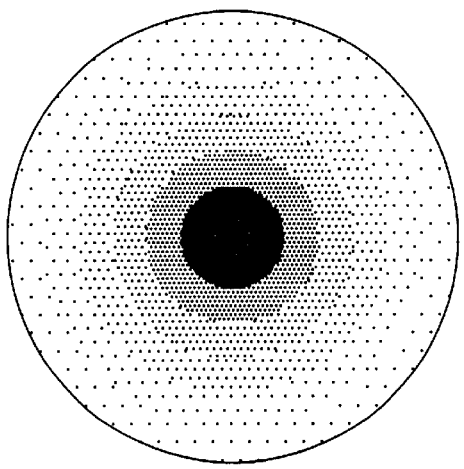
FIG. 6 depicts a representation of the operator's view of power intensity of a laser beam using an infrared electroviewer with the present invention.
Figure 7:
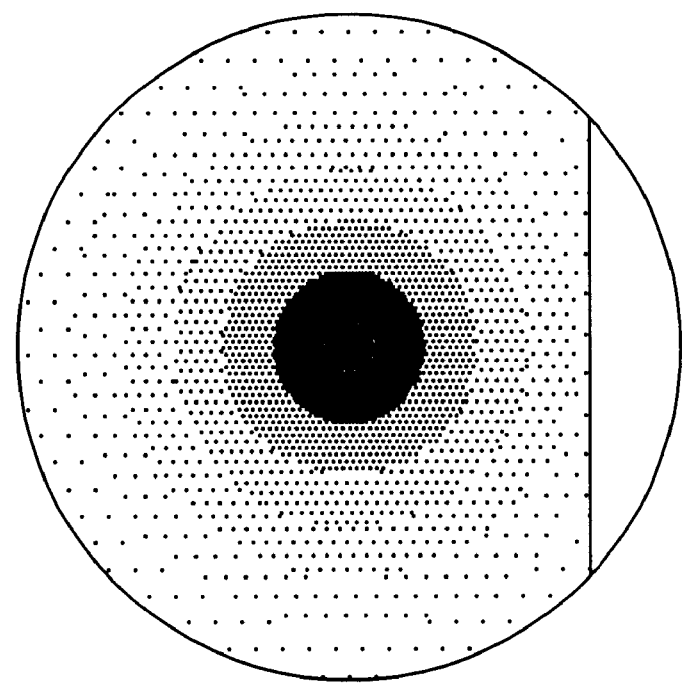
FIG. 7 depicts a representation of the operator's view of power intensity of a laser beam using an infrared electroviewer with the present invention where the laser beam has a demonstrative imperfection.
Figure 8:
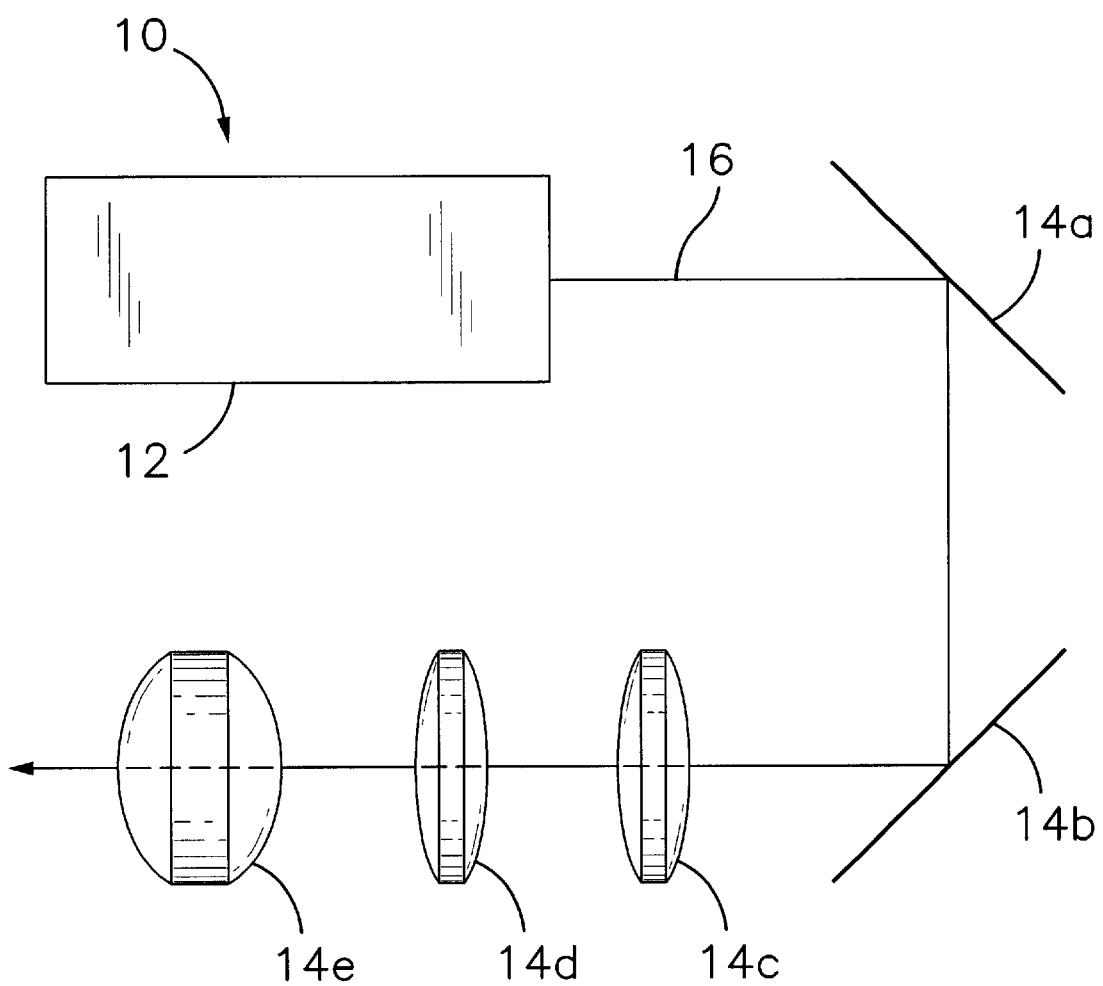
FIG. 8 is a schematic diagram of a typical laser generator system for scribing silicon wafers.

Turning now to the drawings, FIG. 8 is a schematic diagram for a conventional layout 10 of a laser generator 12 and optics 14a and 14b (mirrors) and 14c, 14d, and 14e (lenses) used for scribing markings on a silicon wafer. A laser beam 16 is emitted from the laser generator 12 and passes through the various optics before striking the silicon wafer (not shown) on which the identification markings are scribed.

Figure 9:
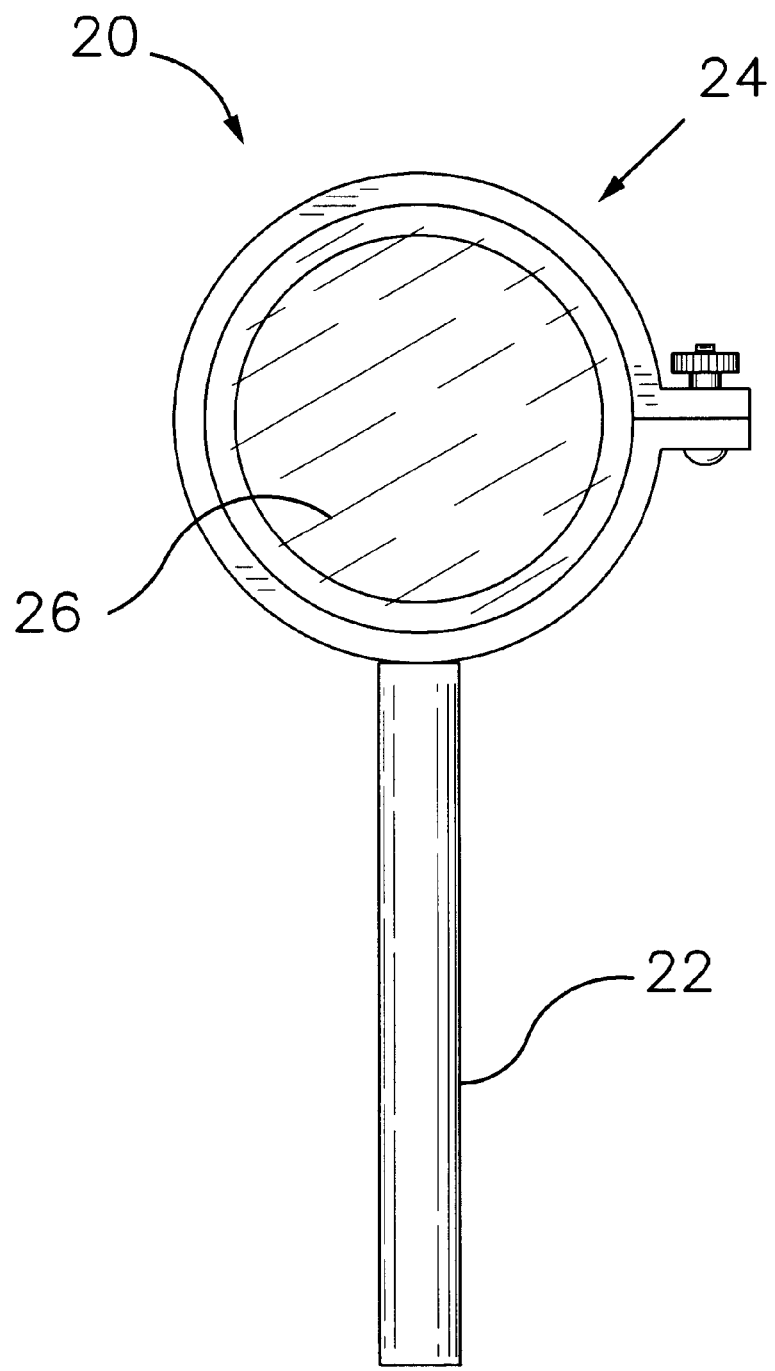
FIG. 9 is a front view of a wand containing a filter medium used in the present invention.

FIG. 9 demonstrates a preferred embodiment of the present invention, wherein a wand 20 contains a handle 22 supporting a bezel 24. Contained within the bezel is a filter medium 26. The filter medium of the preferred embodiment of the present invention has a transmissibility of between approximately 80% and 90%, reflectivity of between approximately 5% and 15%, and absorption between approximately 1% and 10%, at a wavelength of approximately 1.06 microns. One source of such a filter medium is found in a vinyl anti-static bag produced by Unisource Corp., model number 30H3241, which provides approximately 88% transmissibility, 8% reflectivity, and 4% absorption. The wand 20 is held by the operator, and placed in the path of the laser beam 16 after the optic of interest and before the next optic in the path of the laser beam 16 such that the laser beam 16 passes through the filter medium 26. An infrared viewing scope is then aimed at the filter medium 26, and the operator uses the infrared viewing scope to look at the laser beam 16 where it strikes the filter medium 26.

As needed, the operator would sequentially look at the quality of the beam after passing each of the various optics, such as 14a through 14e of FIG. 8. The operator would then be able to see the effect each subsequent optic has on the beam quality, and thereby make adjustments as needed.

Figure 10A:
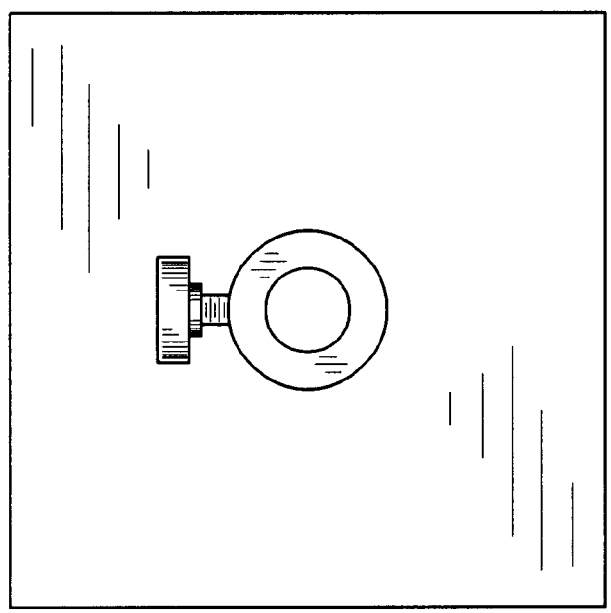
FIG. 10a is a top view of a stand containing a filter medium used in the present invention.
Figure 10B:
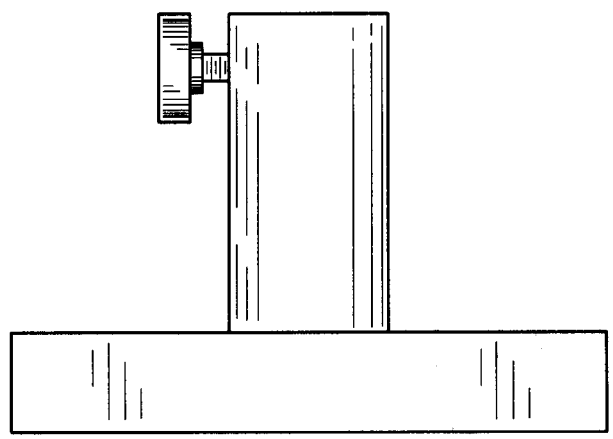
FIG. 10b is a side view of a stand containing a filter medium used in the present invention.

As demonstrated in FIG. 10, the filter medium could be attached to a self-supporting base that would allow the operator to place and secure the filter medium in a desired location, and then move away from the beam path to improve safety and stability. This preferred embodiment could be manufactured in a variety of shapes and sizes with adjustable parts to facilitate use in many different machines as needed.

Other embodiments of the present invention will be apparent to those skilled in the art from a consideration of this specification or practice of the invention disclosed herein. It is intended that the specification be considered as exemplary only, with the true scope and spirit of the invention being indicated by the following claims.

I claim:

1. An apparatus for assisting the viewing of the peripheral edge of a laser beam, comprising:

a) a bezel, b) a filter medium securely held by the bezel, and c) a projection securely mounted perpendicular to said bezel, wherein said projection is used to hold said filter medium in the direct path of a laser beam, and wherein said filter medium has a transmissibility of between 80% and 90%, reflectivity of between 5% and 15%, and absorbency of between 1% and 10% at 1.06 micron wavelength light.

2. The apparatus of claim 1, wherein said filter medium is made of a flexible plastic.

3. The apparatus of claim 2, wherein said filter medium has about 88% transmissibility at 1.06 micron wavelength light.

4. The apparatus of claim 2, wherein said filter medium has about 8% reflectivity at 1.06 micron wavelength light.

5. The apparatus of claim 2, wherein said filter medium has about 4% absorbency at 1.06 micron wavelength light.

6. The apparatus of claim 1, wherein said projection is a rod that is held by an operator.

7. The apparatus of claim 1, wherein said projection is an adjustable, self-supporting stand.

8. A method of viewing the peripheral edge of a laser beam for determining the quality of the beam after the beam passes through an optic, wherein a filter medium is placed after an optic, and an infrared electroviewer is aimed at said filter medium to inspect the beam as it interacts with the filter medium, said filter medium having a transmissibility of between 80% and 90%, reflectivity of between 5% and 15%, and absorbency of between 1% and 10% at 1.06 micron wavelength light.

9. The method claim 8, wherein said filter medium is made of flexible plastic.

10. The method of claim 8, wherein said filter medium has about 8% reflectivity at 1.06 micron wavelength light.

11. The method of claim 8, wherein said filter medium has about 88% transmissibility at 1.06 micron wavelength light.

12. The method of claim 8, wherein said filter medium has about 4% absorbency at 1.06 micron wavelength light.

* * * * *